United States Patent Office 3,732,336
Patented May 8, 1973

3,732,336
METHACRYLONITRILE POLYMERIZATION PROCESS
June T. Duke, Chagrin Falls, and Dorothy C. Prem, Warrensville Heights, Ohio, assignors to The Standard Oil Company, Cleveland, Ohio
No Drawing. Filed June 2, 1971, Ser. No. 149,256
Int. Cl. C08f 15/22, 15/36, 19/16
U.S. Cl. 260—881
7 Claims

ABSTRACT OF THE DISCLOSURE

A polymerization process is described in which methacrylonitrile homopolymers and copolymers are prepared by free radical polymerization at improved rates by conducting the polymerization in aqueous emulsion in the presence of some preformed seed polymer having small particle size.

---

Figure 1:
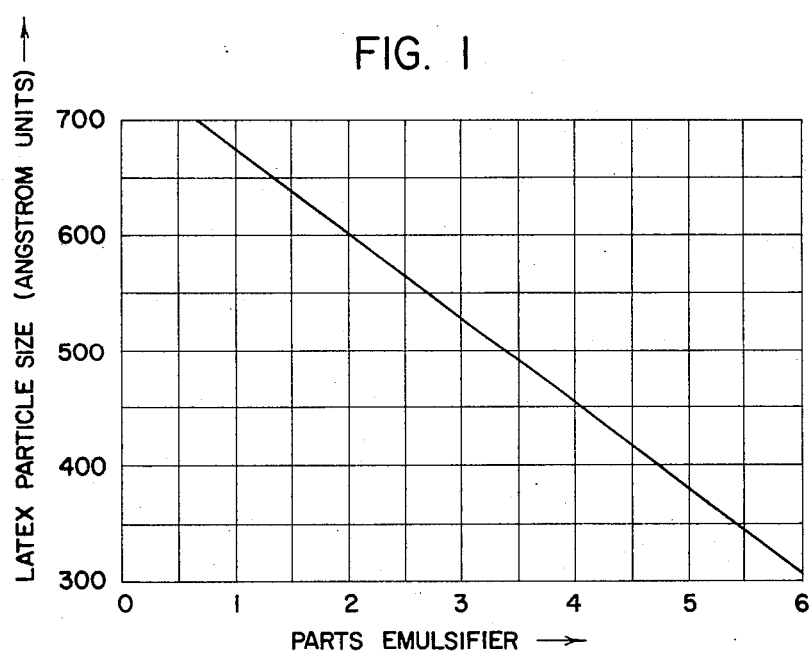

The present invention relates to an improved process for the polymerization of methacrylonitrile and more particularly pertains to a process for the rapid polymerization and copolymerization of methacrylonitrile which includes the presence of preformed polymer particles in the polymerization mixture.

The homopolymers and copolymers of methacrylonitrile are well known to those skilled in the art. It is also well known that methacrylonitrile is a relatively slow reacting monomer in free radical addition polymerization when compared with other common polymerizable vinyl monomers such as acrylonitrile, styrene, vinyl acetate, ethyl acrylate, methyl methacrylate, etc. The homopolymers and copolymers of methacrylonitrile are known to be useful for a wide variety of purposes including fibers, rubbers, adhesives, and the like. One serious drawback to the use of methacrylonitrile homopolymers or copolymers is the fact that considerable time is consumed in their production and this adds to their cost.

It is therefore an object of this invention to provide a process for preparing methacrylonitrile homopolymers and copolymers by an improved free radical addition polymerization process which occurs at a much more rapid rate than do the prior art processes when they are applied to this monomer. That this and other objects have been accomplished by the present invention will become apparent from the following description and examples.

We have discovered that methacrylonitrile can be homopolymerized or copolymerized at a relatively rapid rate when there are included in the polymerization mixture some small particles of a preformed or "seed" polymer which may include methacrylonitrile homopolymer or copolymer.

Monomers which can be used in minor proportions in the monomer component in the instant process in addition to the seed polymer and essential monomer, methacrylonitrile, which is present as the major proportion of the monomer component, include acrylate esters such as methyl acrylate, ethyl acrylate, the propyl acrylates, the butyl acrylates, the amyl acrylates, the hexyl acrylates, cyclohexyl acrylate, phenyl acrylate, the octyl acrylates and the like; the methacrylate esters such as methyl methacrylate, ethyl methacrylate, the propyl methacrylates, the butyl methacrylates, the amyl methacrylates, the hexyl methacrylates, cyclohexyl methacrylate, phenyl methacrylate, the decyl methacrylates and the like; vinyl esters such as vinyl acetate, vinyl propionate, the vinyl butyrates, vinyl benzoate, isopropenyl acetate, and the like; the vinyl aromatics such as styrene, alpha-methyl styrene, vinyl toluene, the vinyl xylenes, the vinyl naphthalenes, isopropenyl benzene, and the like; vinyl amides such as acrylamide, methacrylamide, N-methyl acrylamide, vinyl benzamide, N-vinyl pyrrolidone, maleimide, and the like; the vinyl halides such as vinyl chloride, vinyl bromide, vinyl fluoride, vinylidene chloride, vinylidene fluoride, dichloro difluoro ethylene, tetrafluoroethylene, the halo styrenes, and the like; olefins such as ethylene, propylene, isobutylene, butene-1, diisobutylene, and the like. Most preferred are methyl acrylate, methyl methacrylate and styrene and mixtures thereof.

The foregoing monomers are also useful in the production of seed latices used in the process of this invention.

The preferred method of polymerization in our process is aqueous emulsion polymerization in the presence of an emulsifier and a free-radical generating polymerization initiator in the range of from about 15 to 60% total solids and preferably to high conversion, i.e., about 50% or higher conversion of monomers to polymer, at a temperature in the range of from about 0° C. to 100° C. in the substantial absence of molecular oxygen.

Suitable emulsifiers include fatty acid soaps such as sodium laurate; organic sulfates and sulfonates such as sodium lauryl sulfate, the alkali metal salts of sulfonated petroleum or paraffinic oils, the sodium salts of aromatic sulfonic acids such as the sodium salts of naphthalene sulfonic acids, the sodium salts of dodecane-1-sulfonic acid, octadecane-1-sulfonic acid, etc.; aralkyl sulfonates such as sodium isopropyl benzene sulfonate; sodium isobutyl naphthalene sulfonate, and alkali metal salts of polymerized alkyl naphthalene sulfonic acids; alkali meta and ammonium salts of sulfonated dicarboxylic acid esters and amides such as sodium dodecyl sulfosuccinate, sodium N-octadecyl sulfosuccinamate, the polyalkyl and polyalkaryl alkoxyalkylene phosphonate acids and salts more fully described in U.S. Pat. No. 2,853,471, and the like; the so-called cationic emulsifiers such as the salts of strong inorganic acids and organic bases containing long carbon chains, for instance, lauryl amine hydrochloride, the hydrochloride of diethyl aminoethyl decyl amine, trimethyl cetyl ammonium bromide, dodecyl trimethyl ammonium bromide, the diethyl cyclohexylamine salt of cetyl sulfonic esters. Nonionic emulsifiers may also be used and these include the polyether alcohols prepared by condensing ethylene or propylene oxide with higher alcohols, the fatty alkylamine condensates, the diglycol esters of lauric, oleic and stearic acids, and others. It is often desirable to add post-polymerization emulsifiers to the latices embodied herein for improved stability.

The polymerization catalyst or initiator, usually required for satisfactory polymerization rate, may be any of those commonly employed for the polymerization of vinyl monomers and include the various peroxygen compounds such as hydrogen peroxide, benzoyl peroxide, pelargonal peroxide, t-butyl peroxypivalate, cumene hydroperoxide, tertiary butyl hydroperoxide, tertiary butyl perbenzoate, sodium, potassium and ammonium persulfate, and others such as those disclosed in U.S. Pats. Nos. 2,471,959 and 2,491,471.

Particularly preferred as polymerization initiators are the water-soluble peroxygen compounds such as hydrogen peroxide, and the sodium, potassium and ammonium persulfates, the water-soluble oxidation-reduction or "redox" types of catalysts and the heavy metal activated, water-soluble peroxygen and redox catalysts. Included in this list are the water-soluble persulfates; the combination of one of the water-soluble peroxygen compounds such as potassium persulfate with a reducing substance such as a polyhydroxy phenol, an oxidizable sulfur compound such as sodium bisulfite, sodium sulfite and the like; the combination of a water-soluble peroxygen compound such as potassium persulfate and dimethyl amino-propionitrile; the combination of a water-soluble peroxygen compound with a reducing sugar or with a combination of a dimercapto compound and a water-soluble ferricyanide compound and others. Heavy metal ions which greatly activate potassium persulfite and the redox catalyzed polymerizations include those of silver, copper, iron, cobalt, nickel and others. The preferred range of initiator is from about 0.01 to about 5 parts by weight per 100 parts by weight of monomers.

Although the polymerization can be carried out in the presence of air, the initiation period is longer and thus it is preferred to conduct the polymerization reaction in the substantial absence of oxygen by conducting it at reflux or in an inert atmosphere such as nitrogen or helium and the like. The temperature at which the polymerization is carried out is not critical; it may be varied widely from −30° C. to 100° C. or higher, though best results are generally obtained at a temperature in the range of from about 0° C. to about 70° C. Although the pH of the polymerization system is not critical, it is preferred that a pH of about 6–8 be employed during the polymerization reaction. The final polymer latex may be adjusted to any desired pH. Other substances such as buffers, electrolyte salts, mercaptan modifiers, and the like can be incorporated in the polymerization mixture.

In the preferred process of this invention a monomer component comprised of at least 80 parts by weight of methacrylonitrile monomer and from 0 to 20 parts of another monovinyl monomer per 100 parts of monomer component is polymerized in aqueous emulsion in the presence of a free radical initiator and in the presence of from about 5 to about 160 parts by weight of a seed polymer having an average particle size between about 300 and 1000 A.

Preferred polymers used as the seed polymer are polymers prepared in aqueous emulsion and employed in the form of an emulsion in our polymerization process, and those preferred polymers include polymethacrylonitrile, copolymers of methacrylonitrile having up to 20% by weight in them of another monovinyl monomer, polystyrene, polymethyl acrylate, polymethyl methacrylate, polyacrylonitrile and acrylonitrile copolymers containing up to 30% by weight of another monovinyl monomer and mixtures thereof.

The process of this invention is further illustrated in the following examples in which the amounts of ingredients and products are expressed in parts by weight unless otherwise indicated.

EXAMPLE 1

This example demonstrates a preparation of a methacrylonitrile (MAN)—methyl methacrylate (MMA) copolymer latex which is useful as a seed latex in practicing the process of this invention which is further illustrated in subsequent examples.

(A) The polymerization mixture was made up of the following ingredients:

|  | Parts |
|---|---|
| Methacrylonitrile | 95 |
| Methyl methacrylate | 5 |
| $K_2S_2O_8$ | 0.10 |
| n-Dodecyl mercaptan | 1.0 |
| GAFAC RE–610 [1] (emulsifier) | 2.0 |
| Tetrapotassium salt of ethylene diamine tetraacetic acid (chelating agent) | 0.05 |
| Distilled water | 225.0 |

[1] A mixture of $R-O-(CH_2CH_2O-)_nPO_3M_2$ and $[R-O-(CH_2CH_2O-)_n]PO_2M$ wherein $n$ is a number from 1 to 40, R is an alkyl or alkaryl group and preferably a nonylphenyl group and M is hydrogen, ammonia or an alkali metal which composition is sold by the general Aniline and Film Corporation.

A solution of the emulsifier, chelating agent and water was prepared and the pH of the solution was adjusted to 6.7 with KOH. This solution was placed in a stirred polymerization reactor and the remaining ingredients were charged to the reactor. The reactor was purged thoroughly with nitrogen, was sealed and brought to 60° C. with continued agitation. The reaction was continued for 23 hours with continued agitation at 60° C. to produce a latex having a final total solids content of 30.8% by weight and about a 98% conversion of monomer to polymer.

The conversion rate of monomer to polymer was determined in the early part of this polymerization reaction and was found to be as follows:

| Polymerization time, hrs.: | Percent conversion |
|---|---|
| 2 | 1.8 |
| 4 | 16.2 |
| 6 | 42.6 |
| 7¼ | 64.5 |

The average particle size for this final latex, as determined by electron micrograph, was 580 A.

This latex was used as seed in subsequent examples.

(B) A series of polymerizations similar to that described above was carried out in which the amount of emulsifier was varied. The effect of emulsifier on the average particle size of the latex is shown in FIG. 1 of the drawing.

EXAMPLE 2

(A) A copolymer of methacrylonitrile and methyl methacrylate as the monomer component was prepared in aqueous emulsion using the following ingredients:

|  | Parts |
|---|---|
| Methacrylonitrile | 95 |
| Methyl methacrylate | 5 |
| t-Butyl peroxypivalate | 0.5 |
| n-Dodecyl mercaptan | 0.5 |
| Tetrapotassium salt of EDTA (chelating agent) | 0.05 |
| GAFAC RE–610 (emulsifier) | 3.0 |
| Water | 225 |
| Latex from Example 1 (seed) | 26.33 |

The latex from Example 1(A) was used in such an amount that it supplied 8.1 parts of seed resin per 100 parts of monomer in this recipe.

The water, emulsifier and chelating agent were mixed in a polymerization reactor and the pH of the mixture was adjusted to 7.0 with KOH. To this solution was added the remainder of the ingredients, and the reactor contents were purged with nitrogen. The polymerization was carried out at 60° C. with constant agitation and samples of the reaction mixture were withdrawn at intervals and total solids were determined and conversion of monomers to polymer was determined.

Figure 2:
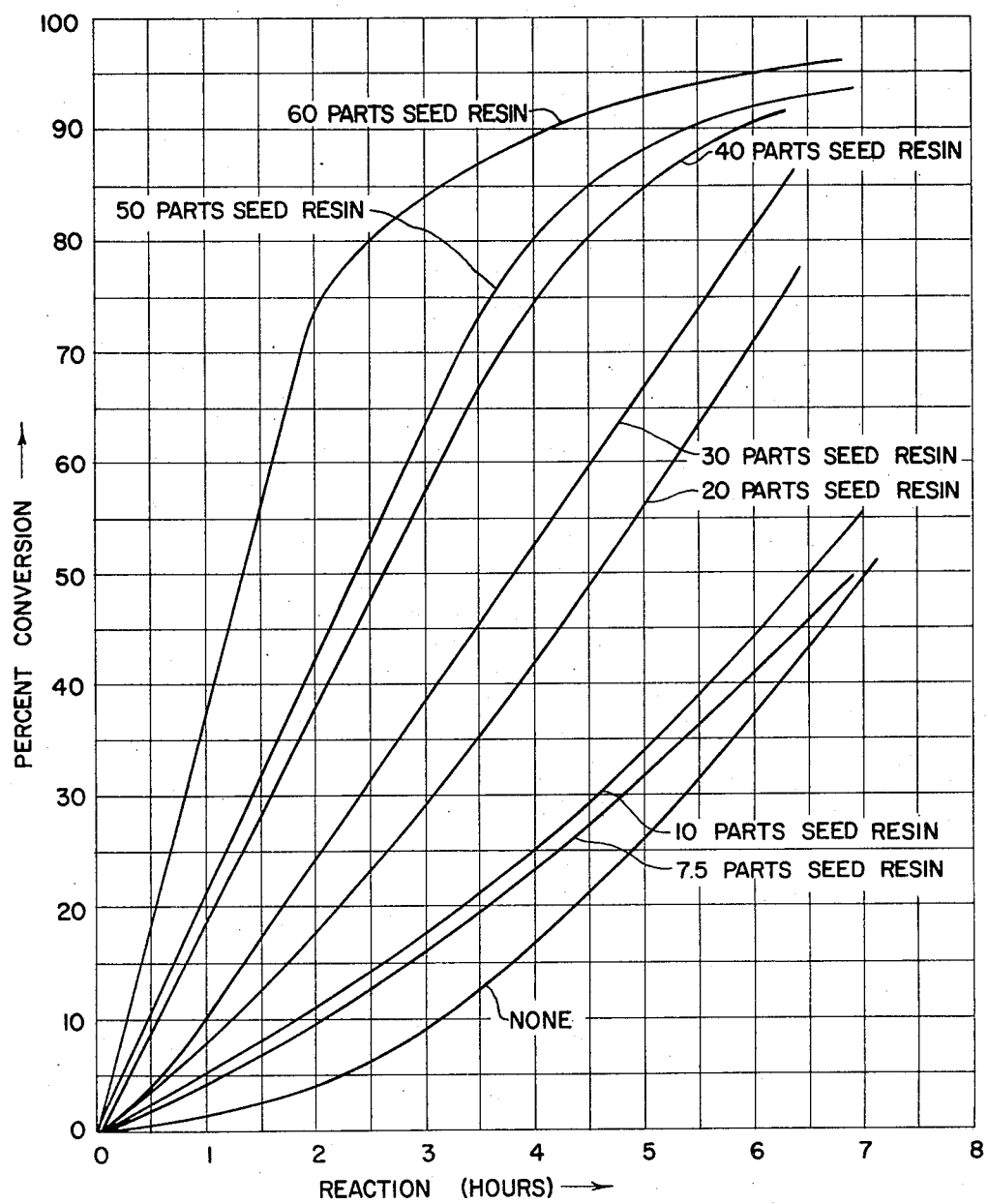

(B) A series of polymerizations were carried out following procedure A of this example in which the amount of seed latex was varied and a control polymerization in which no seed was used was also included in this series. Conversion data for this series of polymers and polymer A above are shown in Table I and in FIG. 2 of the drawing. The conversion data for only the first 8 hours of polymerization is shown in FIG. 2 although in most cases a final conversion was determined after 24 hours polymerization time as shown in Table I. The curves in FIG. 2 are described as parts of seed per 100 parts of final resin at 100% conversion. The amount of seed used can also be expressed as parts per hundred parts of monomer component as shown in the first column of Table I.

TABLE I

| Parts seed/100 parts monomer component | Parts seed [1] | Hours of reaction | Conversion, percent |
|---|---|---|---|
| 0 | None | 2 | 4.0 |
|  |  | 4.5 | 21.2 |
|  |  | 7 | 49.4 |
|  |  | 24 | 92.3 |
| 8.1 | 7.5 | 2 | 9.0 |
|  |  | 4.5 | 27.6 |
|  |  | 7 | 49.6 |
|  |  | 24 | 94.8 |
| 11.1 | 10 | 2 | 10.6 |
|  |  | 4.5 | 27.8 |
|  |  | 7 | 55.5 |
|  |  | 24 | 94.8 |
| 11.1 | 10 | 2 | 12.1 |
|  |  | 4 | 24.8 |
|  |  | 6.5 | 53.9 |
|  |  | 24 | 94.2 |
| 25.0 | 20 | 1.5 | 12.6 |
|  |  | 3 | 28.9 |
|  |  | 6.5 | 78.6 |
|  |  | 24 | 97.0 |
| 42.8 | 30 | 1 | 9.7 |
|  |  | 2.5 | 30.9 |
|  |  | 6.5 | 88.2 |
|  |  | 8 | 95.8 |
| 66.7 | 40 | 1 | 17.4 |
|  |  | 2.5 | 51.2 |
|  |  | 6.5 | 92.5 |
|  |  | 8 | 97.1 |
| 100 | 50 | 2 | 42.1 |
|  |  | 4.5 | 85.3 |
|  |  | 7 | 92.7 |
|  |  | 24 | 100 |
| 150 | 60 | 2 | 74.6 |
|  |  | 4.5 | 91.4 |
|  |  | 7 | 95.8 |
|  |  | 24 | 100 |

[1] Parts seed resin per 100 parts total resin at 100% conversion.

EXAMPLE 3

This example demonstrates that the particle size of resin in the seed latex has an effect on the rate of polymerization of the final resin. In the process of this invention generally, the smaller the particle size, the faster the rate.

(A) A seed latex of a copolymer of methacrylonitrile and methyl methacrylate monomer component was prepared according to the procedure of Example 1 using the following receipe:

| | Parts |
|---|---|
| Methacrylonitrile | 95 |
| Methyl methacrylate | 5 |
| t-Butyl peroxypivalate | 0.5 |
| n-Dodecyl mercaptan | 0.5 |
| GAFAC RE-610 (emulsifier) | 4.0 |
| Tetrapotassium salt of EDTA | 0.05 |
| Distilled water | 225 |

The final latex had a total solids of 29.6%, which corresponds to a 92.8% conversion of monomer to polymer. It can be seen that the above receipe employed twice as much emulsifier as that used in the recipe of Example 1. The effect of this variable on further polymerization rates was determined in (B) of this example.

Figure 3:
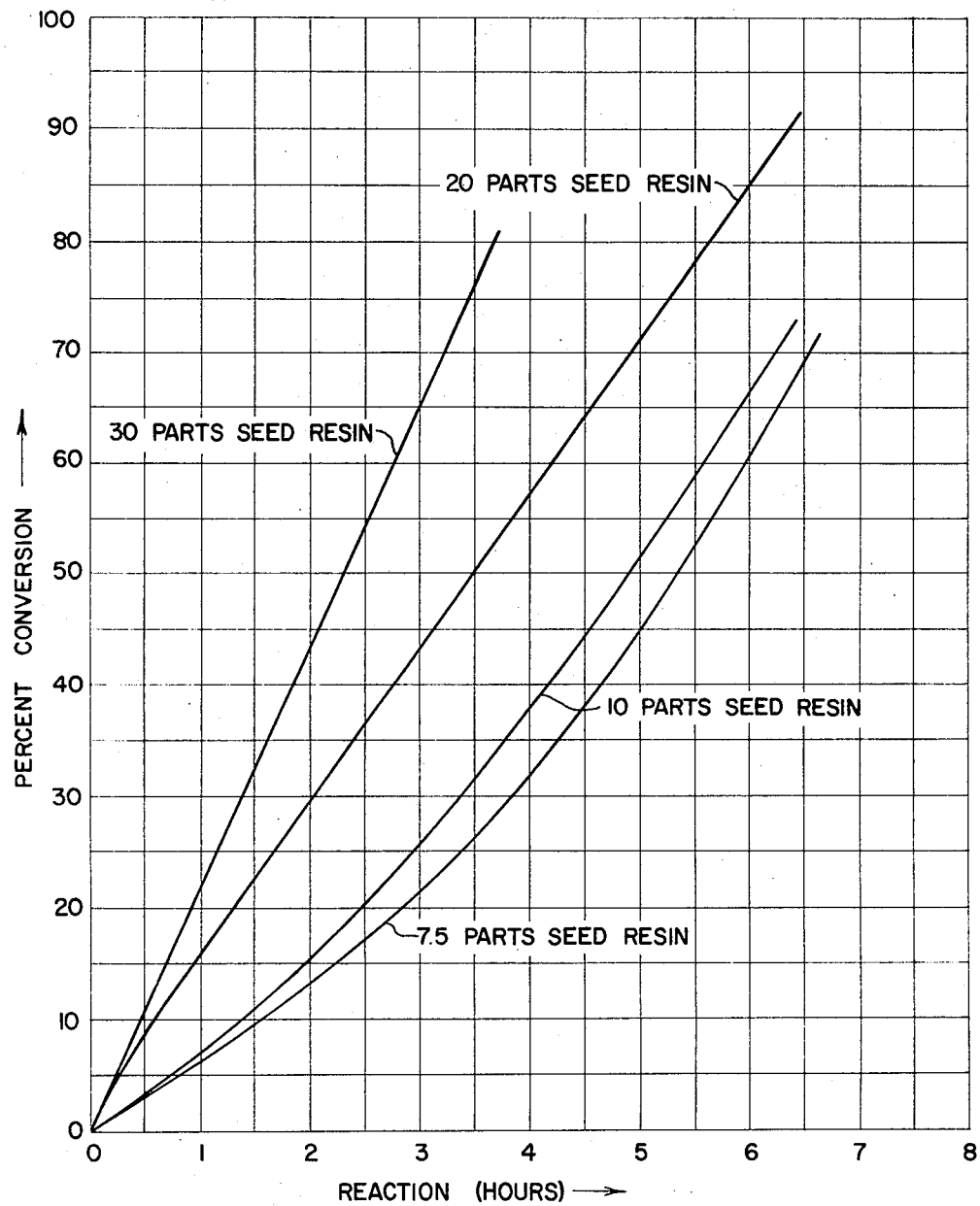

(B) The procedures of Example 2 were repeated using seed latex from A of this example and the conversion rate data are shown in Table II and in FIG. 3 of the drawing.

TABLE II

| Parts seed per 100 parts monomer | Parts seeds per 100 parts total resin | Hours of reaction | Conversion, percent |
|---|---|---|---|
| 8.1 | 7.5 | 2 | 13.7 |
|  |  | 4 | 32.1 |
|  |  | 6.5 | 69.6 |
|  |  | 24 | 93 |
| 11.1 | 10 | 2 | 14.7 |
|  |  | 4 | 38.8 |
|  |  | 6.5 | 73.7 |
|  |  | 24 | 95.7 |
| 25 | 20 | 1 | 16.0 |
|  |  | 2.5 | 37.2 |
|  |  | 6.5 | 92.1 |
|  |  | 8 | 97.6 |
| 42.8 | 30 | 1 | 19.9 |
|  |  | 2.5 | 56.6 |
|  |  | 6.5 | 93.9 |
|  |  | 8 | 98.6 |

It is apparent from this example and Example 2 (see Table III below) that the polymerization rate can be controlled further by lowering the particle size of the seed particles for a given weight level of seed polymer.

TABLE III

Reaction rates using 20 parts of seed resin/100 resin (25 parts of seed resin/100 monomer)

| | Percent conversion | |
|---|---|---|
| | 2 parts emulsifier in seed resin | 4 parts emulsifier in seed resin |
| Hours of Reaction: | | |
| 1 | 8 | 16 |
| 3 | 29 | 44 |
| 5 | 56 | 71 |
| 6.5 | 79 | 92 |
| Average particle size of seed latex, A | 600 | 450 |

EXAMPLE 4

Figure 4:
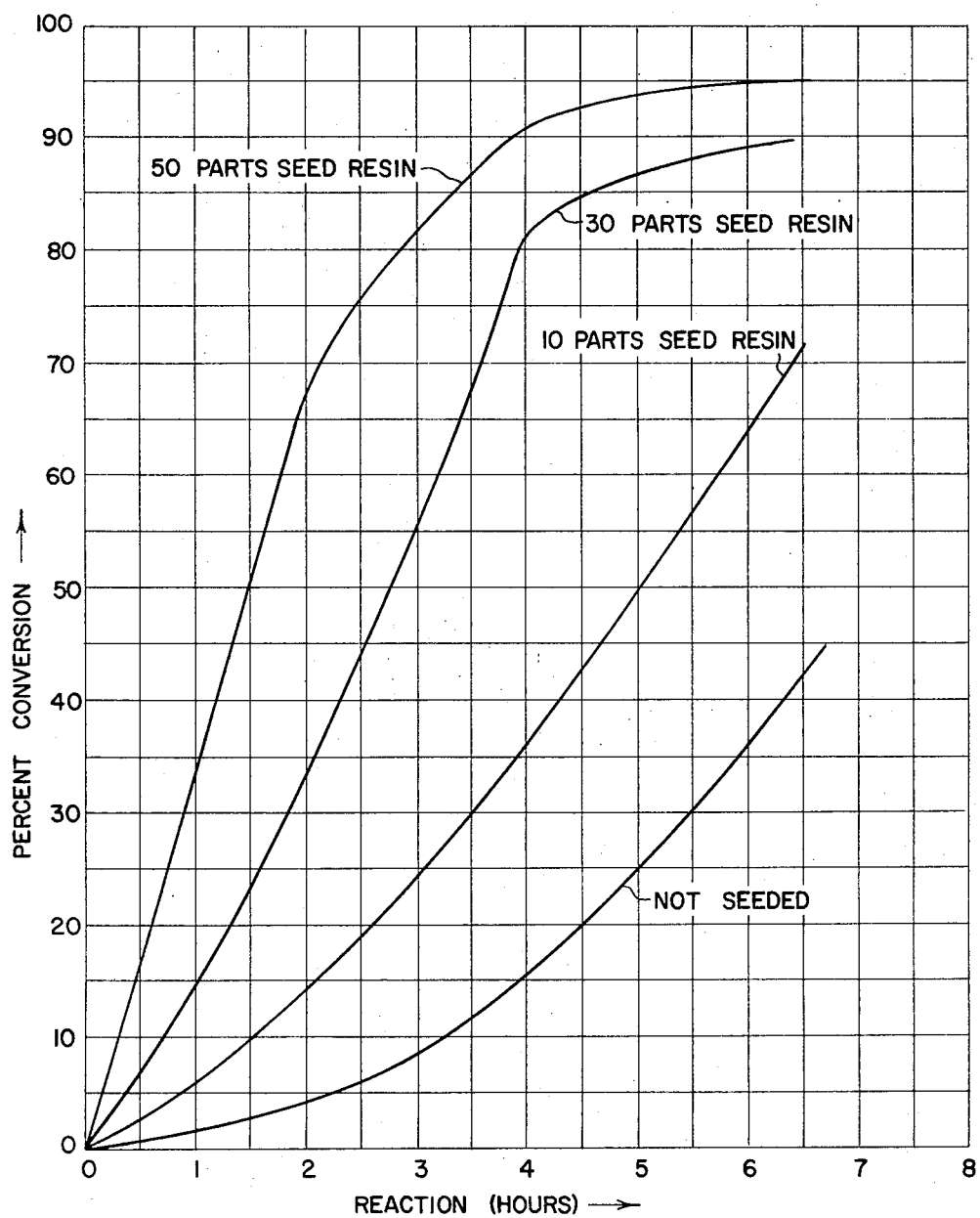

The procedure of Example 2(B) was repeated using 100 parts of methacrylonitrile as the monomer component, and the seed latex from Example 3(A) in the polymerization recipe. Polymerization rate data are given in Table IV and in FIG. 4.

TABLE IV

| Parts seed per 100 parts monomer component | Parts seed per 100 parts total resin | Hours of reaction | Conversion, percent |
|---|---|---|---|
| 0 | None | 2 | 3.9 |
|  |  | 4 | 14.9 |
|  |  | 6.5 | 41.9 |
| 11.1 | 10 | 2 | 13.7 |
|  |  | 4 | 37.6 |
|  |  | 6.5 | 72.3 |
| 42.8 | 30 | 2 | 33.0 |
|  |  | 4 | 81.4 |
|  |  | 6.5 | 89.6 |
| 100.0 | 50 | 2 | 68.1 |
|  |  | 4 | 9.14 |
|  |  | 6.5 | 94.8 |

EXAMPLE 5

This example shows the effect the variation of emulsifier level has on unseeded and seeded polymerization of methacrylonitrile. The following recipe was used:

| | Parts |
|---|---|
| Methacrylonitrile | 100 |
| t-Butyl peroxypivalate | 0.5 |
| n-Dodecyl mercaptan | 0.5 |
| GAFAC RE-610 (emulsifier) | Variable |
| Water | 225 |
| Seed latex (Example 1) | Variable |

Figure 5:
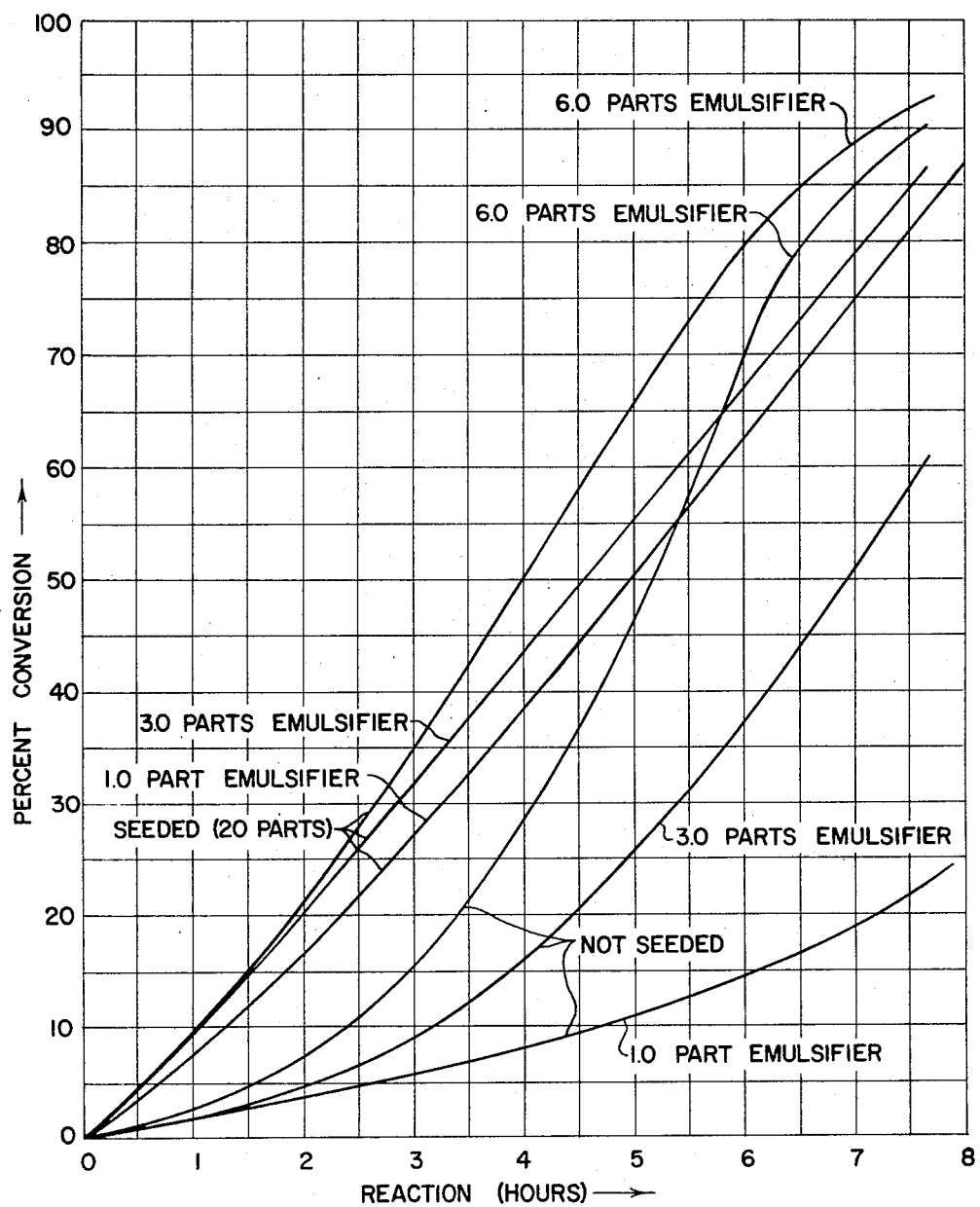

The pH was adjusted to 7 and the polymerizations were carried out in accordance with Example 2. In all of the polymerizations the water level was held constant; that is, when a seed latex was used in the recipe, the amount of water included in the seed latex used was subtracted from the total water so that in each case a total of 225 parts of water was present. The results are shown in Table V and in FIG. 5.

TABLE V

| Parts emulsifier | Hours of reaction | Conversion, percent |
|---|---|---|
| PMAN—not seeded | | |
| 1.0 | 2.25 | 3.6 |
| | 4.25 | 8.6 |
| | 6 | 14.0 |
| | 7.7 | 22.8 |
| | 24 | 81.7 |
| 3.0 | 2.3 | 5.4 |
| | 4.3 | 17.9 |
| | 6.2 | 39.7 |
| | 7.75 | 61.8 |
| | 24 | 91.3 |
| 6.0 | 2.4 | 9.8 |
| | 4.4 | 34.5 |
| | 6.25 | 75.7 |
| | 7.8 | 90.6 |
| | 24 | 95.2 |
| PMAN—Seeded with 20 parts resin/100 parts total resin (25 parts seed per 100 parts monomer component) | | |
| 1.0 | 2.25 | 20.5 |
| | 4.25 | 41.3 |
| | 6 | 61.7 |
| | 7.9 | 86.7 |
| | 24 | 86.3 |
| 3.0 | 2.3 | 23.2 |
| | 4.3 | 47.5 |
| | 6.2 | 68.5 |
| | 7.75 | 86.7 |
| | 24 | 94.5 |
| 6.0 | 2.4 | 25.8 |
| | 4.4 | 55.8 |
| | 6.25 | 82.4 |
| | 7.8 | 93.3 |
| | 24 | 96.9 |

The dependence to a certain degree of the polymerization rate of a monomer such as methacrylonitrile on the amount of primary emulsifier is apparent from the data shown above for the unseeded polymerization.

The seeded polymerizations, on the other hand, are relatively unaffected by the amount of emulsifier, at least in the normal range of 1–3 parts of emulsifier per 100 parts of monomer. Some slight increase in rate of polymerization occurs at the excessively high (6 parts) level of emulsifier. By using the seeding technique of this invention practical emulsion polymerization rates are achieved at relatively low levels of primary emulsifier.

EXAMPLE 6

Figure 6:
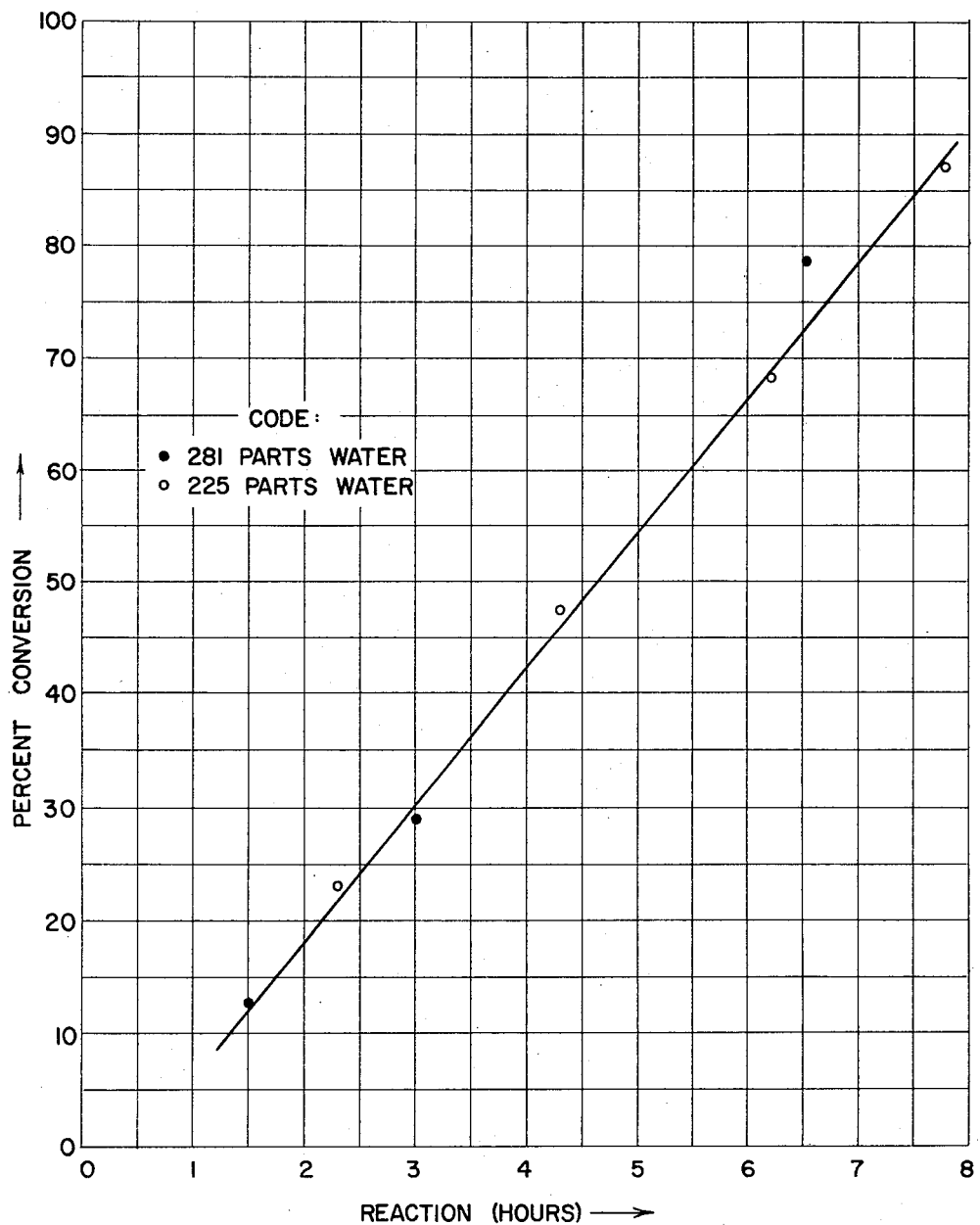

The amount of water in the emulsion polymerization according to the process of this invention does not appear to be critical. In FIG. 6 are shown the polymerization rates of two polymerizations, one according to Example 2 containing 20 parts of seed polymer per 100 parts of final resin (or 25 parts seed/100 parts monomer) and a total of 281 parts of water and the other according to Example 5 containing 20 parts of seed polymer per 100 parts final resin and a total of 225 parts of water.

EXAMPLE 7

(A) Several seed polymers were prepared using the following recipe:

| | Parts |
|---|---|
| Monomer | 100 |
| $K_2S_2O_8$ | 0.06 |
| n-Dodecyl mercaptan | 1.0 |
| Tetrapotassium EDTA | 0.05 |
| GAFAC RE-610 | 3.0 |
| Water | 200 |

The emulsifier, chelating agent and water were mixed first and the pH adjusted to 7.0 with KOH. The other ingredients were added and the polymerization was carried out at 60° C. in the substantial absence of oxygen.

The seed latices prepared in this manner are described in Table VI.

TABLE VI

| Monomer composition | Total solids, percent | Conver, sion percent |
|---|---|---|
| 100 parts styrene | 34.2 | 99.5 |
| 100 parts methyl acrylate | 33.8 | 98.8 |
| 100 parts methyl methacrylate | 34.3 | 99.9 |
| 75/25 acrylonitrile/methyl acrylate | 33.5 | 97.9 |

(B) Each of the seed latices from A above was used to increase the rate of polymerization of a 95/5 mixture of methacrylonitrile/methyl methacrylate by the procedure of Example 2. In each case, sufficient seed latex was added to the polymerization mixture to provide 20 parts by weight of seed resin per 100 parts by weight of final resin assuming complete conversion of the methacrylonitrile-methyl methacrylate monomers or 25 parts seed resin/100 parts monomer component. The conversion rate data are shown in Table VII and are also plotted in FIG. 7. Data for a resin seeded with MAN/MMA resin (Example 3) and an unseeded resin (Example 2) are also indicated in FIG. 7.

TABLE VII

| Composition of seed resin | Hours of reaction | Conversion, percent |
|---|---|---|
| Polystyrene | 1.5 | 9.6 |
| | 3 | 20.7 |
| | 6.5 | 68.6 |
| | 24 | 98.1 |
| Polymethyl acrylate | 1.5 | 15.3 |
| | 3 | 35.2 |
| | 6.5 | 88.1 |
| | 8 | 97.8 |
| Polymethyl methacrylate | 1.5 | 13.4 |
| | 3 | 28.7 |
| | 6.5 | 77.6 |
| | 24 | 98.3 |
| 75 acrylonitrile/25 methyl acrylate | 2 | 13.0 |
| | 4 | 34.6 |
| | 6.5 | 72.8 |
| | 24 | 95.7 |

Figure 7:
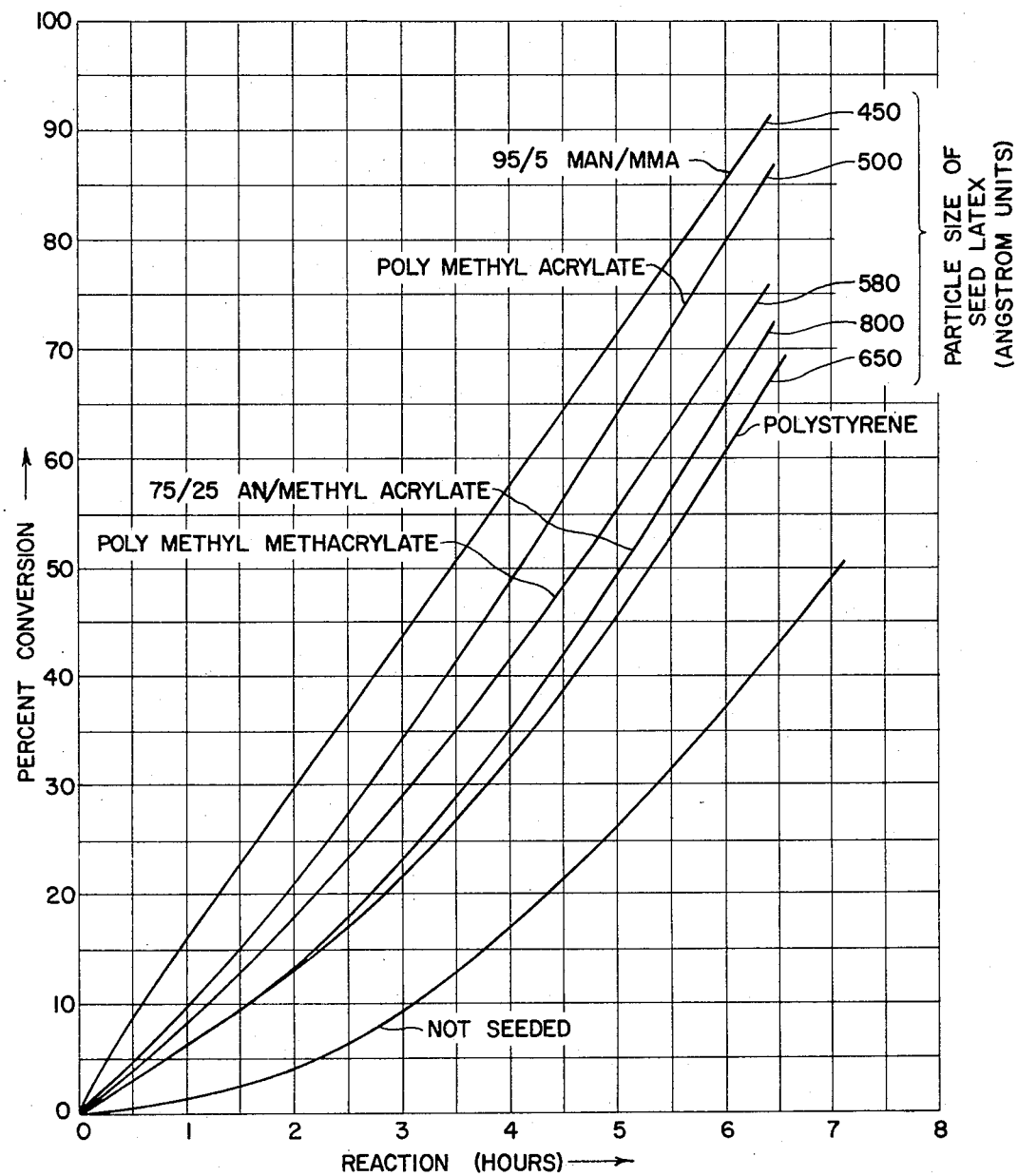

A relationship of rate of polymerization with particle size is seen in FIG. 7. Measurement of the latex particle size for the latices appearing in FIG. 7 were made using a transmission electron microscope.

EXAMPLE 8

Increasing the temperature of free radical polymerizations is a known method for increasing the polymerization rate. For the purpose of comparing the rate increase for a given polymer by temperature increase versus the rate increase by the seeding technique of this invention, polymethacrylonitrile was prepared at 70° C. The recipe and procedures were otherwise the same as those shown in Example 5, with the further exception that no seed latex was included in the polymerization recipe. Rate data appear in Table VIII.

TABLE VIII

| Hours of reaction: | Conversion, percent |
|---|---|
| 2 | 11.6 |
| 4 | 27.2 |
| 6 | 46 |
| 7.5 | 61.6 |
| 10.7 | [1] 70 |

[1] (Prefloc formed.)

Figure 8:
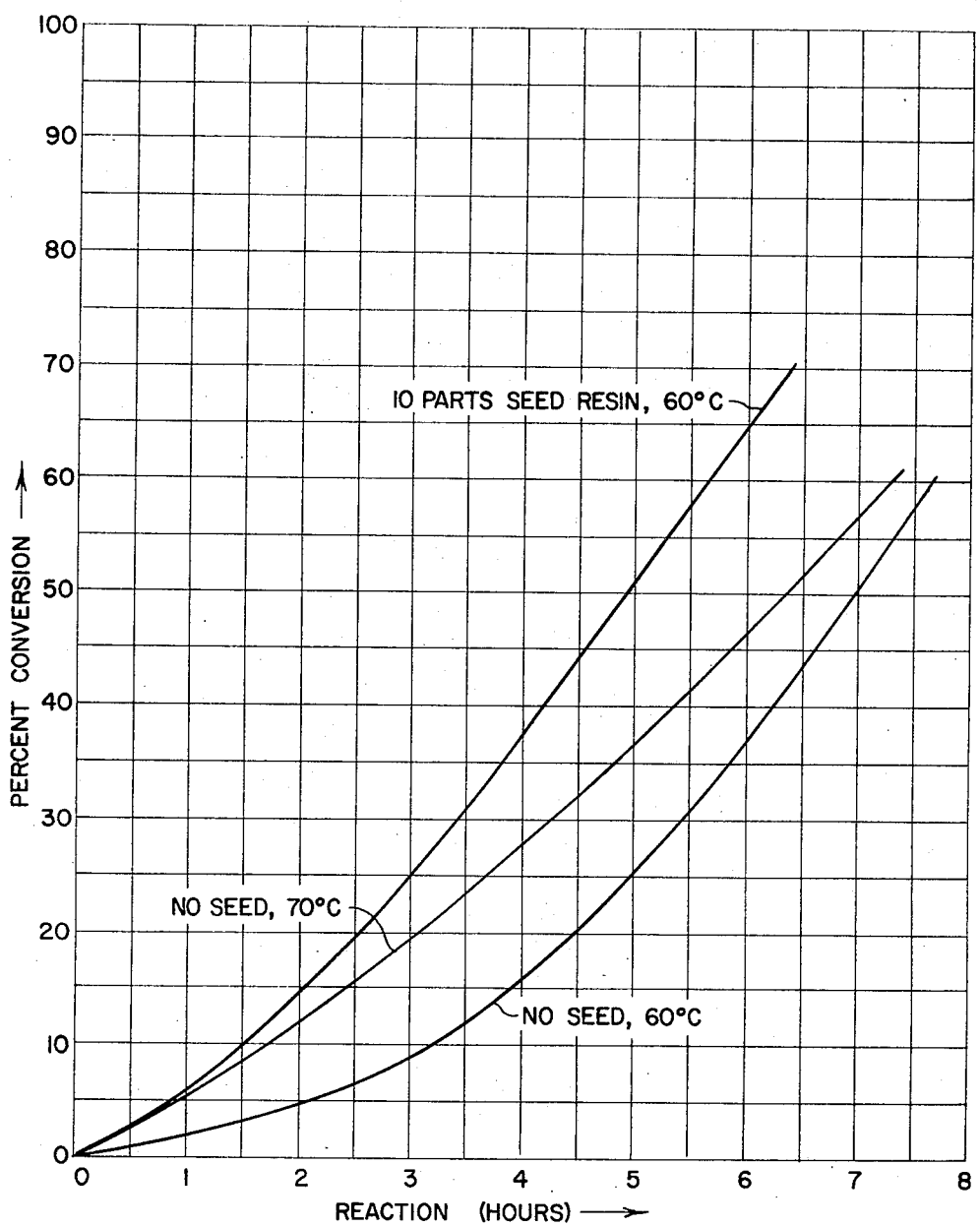

The higher polymerization temperature caused the formation of significant amounts of prefloc which does not occur at the 60° C. polymerization temperature. The rate comparison is also plotted in FIG. 8. FIG. 8 shows that a greater improvement in polymerization rate is achieved by the addition of 10 parts of seed particles (per 100 parts resin, or 11.1 parts seed/100 parts monomer) to a methacrylonitrile polymerization than is gained by a 10° C. increase in the polymerization temperature. Resins of the type prepared at the lower polymerization temperatures also are generally of lighter color and have improved thermal stability over the same resins prepared at higher temperatures.

We claim:

1. A process for the preparation of methacrylonitrile homopolymers and copolymers at improved polymerization rates comprising polymerizing in aqueous emulsion a monomer component of at least 80 parts by weight of methacrylonitrile monomer and from 0 to 20 parts by weight of another monovinyl monomer per 100 parts by weight of monomer component in the presence of a free radical initiator and from about 5 to about 160 parts by weight of a seed polymer having an average particle size of from about 300 to about 1000 A. said seed polymer being at least one member selected from the group consisting of polymethacrylonitrile, copolymers of methacrylonitrile with up to about 20% by weight of another monovinyl monomer, polystyrene, polymethyl acrylate, polymethyl methacrylate, polyacrylonitrile, and acrylonitrile copolymers with up to 30% by weight of another monovinyl monomer.

2. The process of claim 1 wherein the monovinyl monomer is at least one member selected from the group consisting of methyl acrylate, methyl methacrylate and styrene.

3. The process of claim 2 wherein the seed polymer is a copolymer of 95% by weight of methacrylonitrile and 5% by weight of methyl methacrylate.

4. The process of claim 2 wherein the seed polymer is polystyrene.

5. The process of claim 2 wherein the seed polymer is polymethyl acrylate.

6. The process of claim 2 wherein the seed polymer is polymethyl methacrylate.

7. The process of claim 2 wherein the seed polymer is a copolymer of 75% by weight acrylonitrile and 25% by weight of methyl acrylate.

References Cited

UNITED STATES PATENTS

| | | | |
|---|---|---|---|
| 2,958,673 | 11/1960 | Jen | 260—881 |
| 3,031,432 | 4/1962 | Kern | 260—881 |
| 3,041,307 | 6/1962 | Baer | 260—881 |
| 3,087,875 | 4/1963 | Graham et al. | 204—159.16 |
| 3,458,603 | 7/1969 | Griffin | 260—881 |

SAMUEL H. BLECH, Primary Examiner

J. SEIBERT, Assistant Examiner

U.S. Cl. X.R.

260—29.6 RB, 878 R, 882, 883